US008082357B2

(12) United States Patent
Rock et al.

(10) Patent No.: US 8,082,357 B2
(45) Date of Patent: Dec. 20, 2011

(54) METHOD FOR REDUCING THE LATENCY TIME FOR INTERACTIVE DATA COMMUNICATION VIA A SATELLITE NETWORK

(76) Inventors: Klaus Rock, Aalen (DE); Ute Rock, Aalen (DE)

( * ) Notice: Subject to any disclaimer, the term of this patent is extended or adjusted under 35 U.S.C. 154(b) by 735 days.

(21) Appl. No.: 10/331,387

(22) Filed: Dec. 30, 2002

(65) Prior Publication Data
US 2003/0236828 A1 Dec. 25, 2003

Related U.S. Application Data

(60) Provisional application No. 60/366,880, filed on Mar. 22, 2002.

(51) Int. Cl.
*G06F 15/16* (2006.01)
(52) U.S. Cl. .................... 709/232; 709/203; 709/217
(58) Field of Classification Search .................. 725/34; 709/203, 231, 227, 230, 217, 229, 246, 249, 709/219, 216, 232
See application file for complete search history.

(56) References Cited

U.S. PATENT DOCUMENTS

| | | | | |
|---|---|---|---|---|
| 5,872,965 A | * | 2/1999 | Petrick | 712/236 |
| 6,075,796 A | | 6/2000 | Katseff et al. | |
| 6,076,114 A | | 6/2000 | Wesley | |
| 6,381,250 B1 | | 4/2002 | Jacobson et al. | |
| 6,415,329 B1 | * | 7/2002 | Gelman et al. | 709/245 |
| 6,658,463 B1 | | 12/2003 | Dillon et al. | |
| 6,831,912 B1 | | 12/2004 | Sherman | |
| 6,873,627 B1 | * | 3/2005 | Miller et al. | 370/466 |
| 6,934,255 B1 | * | 8/2005 | Toporek et al. | 370/235 |
| 6,947,440 B2 | | 9/2005 | Chatterjee et al. | 370/429 |
| 2001/0013123 A1 | * | 8/2001 | Freeman et al. | 725/34 |
| 2001/0030944 A1 | | 10/2001 | Kato | |
| 2001/0032254 A1 | | 10/2001 | Hawkins | |

(Continued)

FOREIGN PATENT DOCUMENTS

DE 10017631 10/2001

(Continued)

OTHER PUBLICATIONS

Background Information of the instant Application (2003/0236828) par 0002-0009.*
Search report for PCT Application No. PCT/EP02/14793.
Chrungo et al: Smart proxy: reducing latency for HTTP based web transfers across satellite links Personal Wireless Communications 2000, pp. 572-576.

(Continued)

*Primary Examiner* — Karen Tang
(74) *Attorney, Agent, or Firm* — Meyertons, Hood, Kivlin, Kowert & Goetzel, P.C.; Eric B. Meyertons

(57) ABSTRACT

Method for reducing the latency time for interactive data communication between a client computer (12) and a server computer (8), connected via a satellite network (1) containing a geostationary satellite (6), whereby a data processing program (10) is running on the server computer (8) producing data, which are transferred to the client computer (12) in the form of data packets (20, 20$_m$, 20$_{mUDP}$) and displayed by said client computer via a display medium (14) connected to the client computer (12) in the form of an interactive user program (26), and whereby the operator of the client computer (12) is given an input prompt (22) by the user program (26) to enter further data, which are transmitted to the server computer (8) in the form of further data packets (24, 24$_m$, 24$_{mUDP}$) via the satellite network (1), wherein the transmission of further data packets (24, 24$_m$, 24$_{mUDP}$) from the client computer (12) to the server computer (8) occurs essentially without an acknowledgement of the receipt of the transmitted further data packets (24, 24$_m$, 24$_{mUDP}$) by the server computer (8).

28 Claims, 1 Drawing Sheet

U.S. PATENT DOCUMENTS

| | | | |
|---|---|---|---|
| 2001/0043573 A1* | 11/2001 | Kelly | 370/316 |
| 2001/0046210 A1 | 11/2001 | West et al. | |
| 2002/0186683 A1* | 12/2002 | Buck et al. | 370/352 |
| 2003/0004952 A1* | 1/2003 | Nixon et al. | 707/10 |
| 2003/0050015 A1* | 3/2003 | Kelly et al. | 455/67.4 |
| 2003/0058810 A1* | 3/2003 | Petronic | 370/316 |
| 2005/0021832 A1* | 1/2005 | Bennett et al. | 709/235 |
| 2006/0036463 A1* | 2/2006 | Patrick et al. | 705/1 |
| 2007/0069896 A1* | 3/2007 | Boland et al. | 340/572.1 |

FOREIGN PATENT DOCUMENTS

| | | |
|---|---|---|
| EP | 1 085 725 | 3/2001 |
| WO | 01/88761 | 11/2001 |

OTHER PUBLICATIONS

Chotikapong,Y,Sun,Z.: Evaluation of Application Performance for TCP/IP via Satellite Links. In: Satellite Services and the Internet (Ref.No. 2000/017),IEEE Seminar on, 2000.

Criscuolo,Ed,et.al.: Transport Protocols and Applications for Internet Use in Space. In: Aerospace Conference,2001,IEEE Proceedings, vol. 2,2001; $S.2/951-2/962,vol. 2$, Ein Chatprogramm mit UDP, Chatten mit UDP-Sockets zu finden im Internet am Apr. 25, 2001 (Nachweis durch http://web.archive.org) unter: http://web.archive.org/web/*/www.fhniederrhein. de/- gkorsch/ javakurs/wn7/udp.htm.

* cited by examiner

METHOD FOR REDUCING THE LATENCY TIME FOR INTERACTIVE DATA COMMUNICATION VIA A SATELLITE NETWORK

CROSS REFERENCE TO RELATED APPLICATIONS

Priority to German Application Serial No. 102 00 165.0, filed Jan. 4, 2002, and to U.S. Provisional Patent Application No. 60/366,880, filed Mar. 22, 2002, is hereby claimed. Both applications are hereby incorporated by reference herein.

BACKGROUND INFORMATION

The present invention relates to a method for reducing the latency time for interactive data communication between a client computer and a server computer connected via a satellite network containing a geostationary satellite, as well as a satellite network for undertaking such a method.

Data communication via satellite networks employs preferably geostationary satellites positioned at a distance of approximately 36 000 km above the surface of the Earth and moving in conjunction with the Earth while maintaining an essentially fixed position in relation to the surface. As a result, when observed from the Earth it appears as if the satellite remains stationary above the area of the Earth's surface which is situated below the satellite and within which communication with the satellite is possible. This area is often referred to as the "footprint".

This has produced to date a number of satellites lined up practically like pearls on a string at a distance of approximately 36 000 km above the equator.

Because of this great distance and the finite propagation speed of electromagnetic signals, data communication via geostationary satellites is a problem, in that the delay of electromagnetic signals from a transmitter on the Earth to the satellite and from there to the receiver is about 0.24 seconds, so that an answer sent by the receiver without any time delay will not reach the transmitter until approximately 2 seconds later at the earliest due to additional electronic loss of time during signal conversion.

For interactive data communication between a client computer and a server computer, where the server computer undertakes the actual data processing and the client computer simply assumes the function of an intelligent terminal producing for the user of the client computer an interactive screen display using the data transferred by the server computer via the geostationary satellite, this compulsory time delay, also often described as latency time, means that a character entered by the user of the client computer, for example, via a keyboard or a movement of the mouse, is acknowledged on the screen of the client computer by a corresponding echo from the server computer after two seconds at the earliest.

Because this time delay of approximately 2 seconds, which occurs for each user input via the keyboard, mouse or other data input device of the client computer, is unacceptable for interactive data communication, interactive client-server applications such as ASP software with data-driven applications, which are of benefit, for example, in terrestrial connections with a large number of users and can be undertaken with the aid of operating systems like UNIX or Windows 2000 Server etc., are not practicable via geostationary satellites.

On the other hand, satellite connections are best suited to transferring mass data, for example, analogue and digital television programs, videos and Internet downloads, due to their high bandwidth and secure transfer properties and based on the fact that these do not require any interactive inquiries and acknowledgements to be transmitted via the satellites.

These mass data are sent to the geostationary satellite as a continuous data stream via so-called satellite HUBS and central server computers connected to them and distributed by the satellite to a number of satellite receiver stations within the area of the footprint.

BRIEF SUMMARY OF THE INVENTION

Accordingly, an object of the present invention is to create a method as well as a satellite network capable of undertaking the method which can be used to reduce the latency time for interactive data communication between a client computer and server computer connected via a geostationary satellite.

According to the inventive method for reducing the latency time for interactive data communication between a client computer and server computer, both computers are connected via a satellite network containing a geostationary satellite. The server computer is equipped with an interactive data processing program, for example a database application, word processing program etc., producing data, which are transferred to the client computer in the form of data packets via the satellite network and displayed in the form of an interactive user program on a visual display medium, for example a monitor, connected to the client computer. The user of the client computer operating with the interactive user program is made aware on the monitor via an input prompt produced by the user program for example a flashing cursor, a screen message, an acoustic signal or some other method, that the user program requires the input of further data which should be entered by the operator via an input medium for example a keyboard, a graphic tablet, a mouse or another input device. The further data are then sent from the client computer to the server computer via the satellite network in the form of further data packets, and the server computer uses the data from the further data packets to continue running the data processing program.

The inventive method is distinguished by the fact that the transmission of further data packets from the client computer to the server computer occurs essentially without an acknowledgement of receipt of the transmitted further data packets by the server computer.

Alternatively, by the same means the transmission of the data packets from the server computer to the client computer can also occur essentially without acknowledgement of the receipt of the transmitted data packets by the client computer which may for some applications already be sufficient to allow the practicable operation. However, with respect to an optimum running speed of the interactive program on the client computer, it is beneficial in this context for both the uploading of further data from the client computer to the server computer and downloading of data from the server computer to the client computer to occur essentially without transmission of acknowledgements or requests for acknowledgements.

Here "essentially" means that an acknowledgement is transferred considerably less often, for example after 100 or more transmitted data packets, than in conventional well-known client-server applications using a terrestrial network connection, where an acknowledgement is generally required after each transmitted data packet.

As the patent applicant has discovered, only by this means is it possible to offer a surprising method for running client-server applications such as ASP software or internet applications for interactive data communication via a geostationary satellite at a speed which the user of such client-server applications expects as the minimum requirement in order to be able to operate efficiently when using such applications interactively, and, what is more, at a speed that has already become the norm for terrestrial connections.

This can be explained by the fact that, contrary to terrestrial systems—where it is absolutely essential to have constant acknowledgement of the correct receipt of transferred data packets between the client computer and server computer, particularly in the field of the internet, due to the constantly changing transfer routes within terrestrial network connection (routing)—the transfer of data via satellite networks with geostationary satellites is extremely reliable and essentially confined to a secure transfer route. As the patent applicant has discovered, the invention also allows interactive work on a client computer with a very high degree of reliability and in a manner well-known to client-server applications which are operated via terrestrial network connections i.e. without the constant sending of acknowledgements or sending of requests for acknowledgement of receipt of previously transmitted data packets—each of which is associated with a time delay of at least 2 seconds.

A further advantage associated with the inventive method is that it is possible to transfer data between the ground stations (satellite HUBS) connected to the server and the geostationary satellite, as well as between the satellite and numerous receiver stations, which depending on the client-server system, may include up to several thousand stations, with a degree of tapping security not achievable with terrestrial systems.

According to the preferred embodiment of the inventive method the data packets transmitted from the server computer to the client computer and preferably also the further data packets transmitted from the client computer to the server computer are transferred via the geostationary satellite in accordance with the UDP network transfer protocol. It is true that this UDP network transfer protocol represents a well-known standard transfer protocol for unilateral downloading of large volumes of data such as video images or music files etc. by servers, where the appearance of occasional errors in the data packets is not important except for a slight reduction in quality; however, due to the possibility of acknowledgements not being transmitted it is certainly not suitable as a transfer protocol for interactive client-server applications where data are transferred via a terrestrial network connection and the absence of even just a few data bits in a data packet would require the whole packet to be transmitted again.

Here the data packets transferred from the server computer to the client computer and/or further data packets transferred in the opposite direction from the client computer to the server computer in accordance with the UDP network transfer protocol are generated through conversion from data packets and/or further data packets which have been produced by the server or client computer for transfer according to the TCP network transfer protocol which is currently the standard transfer protocol for error-free transfer of data via the internet and employed by almost all operating systems currently used for client-server applications.

This conversion may be performed by the relevant software on the client computer or server computer which converts a data packet produced according to the TCP standard to a data packet corresponding to the UDP standard by the familiar change or exchange of the appropriate parts of the data packet. It is preferable here that the software intervenes at the level of the operating system, which is possible in the operating system known as "Windows 2000 Server" of the Microsoft Corporation, USA for example in the area of the program module known as "Winsocket". However, conversion may be carried out by the same means with the aid of suitable hardware devices which may be realized, for example by appropriately designed parts of network cards, via which the client or server computer are coupled to their assigned satellite transmitting/receiver device.

According to a further embodiment of the inventive method the establishment of the network connection and/or completion of transfer of the data packets and/or further data packets between the client computer and server computer via the geostationary satellite is induced by the transfer of a data packet and/or further data packet which has been produced for transfer in accordance with the TCP network transfer protocol and has preferably not been converted. This ensures a more secure establishment of a connection via the satellite and the assignment of the network connection to a firm port or transfer channel of the geostationary satellite, which allows interference-free data transfer in both directions without the use of acknowledgements during the subsequent transfer according to the UDP network transfer protocol by converting the TCP data packets into UDP data packets.

In order to assimilate the behavior of the interactive user program even more closely to that of a user program operated via a terrestrial connection, it may be further envisaged that the further data packets are scanned for redundant data before sending to the server computer and these detected redundant data are removed from the further data packets or replaced by data already entered or stored. Removal of the redundant data from the further data packets may occur either in the hardware using a hardware unit of the client computer or via a data processing program running on the client computer which preferably also intervenes at an operating system level.

The redundant data removed from the further data packets may comprise in the further data packets sent by the client computer periodically repeating portions of data, particularly portions of data which ensure that the network connection between the client computer and the server computer is maintained.

According to a further optimized embodiment of the inventive method with respect to a high speed of operation, the periodically repeating portions of data produced by the appropriate operating system software of the client computer for transmission to the server computer and removed from the further data packets are produced independently by the server computer without them having been actually transmitted by the client computer.

By the same process, the data packets produced by the server computer are scanned for redundant data before sending to the client computer and these detected redundant data are removed from the data packets. It is also possible, however, to replace the detected redundant data in the data packets by data which are, for example stored in the server computer or produced on demand by calculation.

The removal of the redundant data from the data packets may occur using hardware by using a hardware unit of the server computer or via software by using a data processing program running on the server computer.

The redundant data contained in the data packets sent by the server computer and to be removed from them include in particular periodically repeating portions of data which are required by the interactive user program for interactive display of flashing input prompts on the screen. However, likewise they may also comprise portions of data which are required by the client computer to maintain the network connection between the client computer and the server computer.

According to a further embodiment of the invention the periodically repeating portions of data removed from the data packets transmitted by the server computer are preferably produced independently by the client computer without them actually having been sent by the server computer. Thus, the flashing cursor on the screen of the client computer in particular may be produced independently in the software by the client computer itself without the need for the server computer to transmit the relevant data at regular intervals.

Further it may be envisaged that the client computer has means of detecting frequently recurring data sequences in the data packets, filing a copy of these frequently recurring data sequences or an image representation corresponding to these data sequences in the memory of the client computer and displaying on the interactive display medium the copy of the data sequences or the image representation in the memory instead of the recurring data sequences.

In the preferred embodiment of the invention several of the data packets and/or further data packets transferred between the server computer and the client computer via the geostationary satellite are combined into larger data packets and/or larger further data packets in order to increase data throughput. The length of the combined larger data packets and/or combined larger further data packets is chosen preferentially such that transfer of the data packets via the geostationary satellite only just occurs without fragmentation of the data packets. The optimum size of the data packets and/or further data packets—frequently referred to amongst experts as "maximum transmission unit" (MTU)—is determined preferably by the server computer when setting up the satellite network for each individual connection to a client computer based on parameters specific to the connection, which may be, for example by the transfer of test data packets of various length and measurement of the respective transfer time.

It is possible by the same means, however, for the server computer to determine dynamically from time to time the optimum size (MTU) of the larger data packets and/or larger further data packets during data exchange between the client computer and server computer for the particular connection to the client computer on the basis of parameters specific to the connection; this may be done, for example through calculation or by varying the size of the data packets.

According to a further idea based on the invention, a satellite network for undertaking the previously described method comprises a server computer connected to a client computer via a geostationary satellite, whereby the server computer contains a data processing program producing data which are transferred to the client computer in the form of data packets and displayed in the form of an interactive user program via a display medium connected to the client computer. Here the operator of the client computer is given an input prompt by the user program to enter further data, which are transmitted to the server computer in the form of further data packets via the satellite network.

The satellite network according to the invention is distinguished by the fact that the transmission of further data packets from the client computer to the server computer occurs essentially without an acknowledgement of receipt of the transmitted further data packets by the server computer. Here "essentially" means that an acknowledgement is transferred considerably less often, for example after 50, 100 or more transmitted data packets, than in conventional well-known interactive client-server applications using a terrestrial network connection, where an acknowledgement is generally required after each transmitted data packet.

Alternatively, by the same means the transmission of the data packets from the server computer to the client computer can also occur essentially without acknowledgement of the receipt of the transmitted data packets by the client computer which is for some applications already sufficient to allow practicable operation. However, with respect to an optimum running speed of the interactive program on the client computer, it is beneficial in this context for both the uploading of further data from the client computer to the server computer and downloading of data from the server computer to the client computer to occur essentially without transmission of acknowledgements or requests for acknowledgements.

The aforementioned satellite network concerns in particular an IP satellite network, in which the data packets and further data packets are sent according to the internet protocol (IP) which represents the basic level for data communication between two computers on which the TCP as well as the UDP network transfer protocol are based.

Finally, a further idea based on the principle of the invention comprises a data carrier having a software program which undertakes a reduction in the latency time for interactive data communication between a client computer and a server computer according to the method described above which are connected via a satellite network containing a geostationary satellite. Here the data carrier may include in particular the hard disk of the client computer and/or server computer, but may also be an external data carrier such as a CD-ROM, DVD-ROM or other carrier medium.

The software program stored on the data carrier is distinguished by a program code which essentially removes the requests for acknowledgement of the receipt of the further data packets to be transmitted to the server computer from the further data packets, which are produced by the client computer during display of the interactive user program or the entering of data before they are transmitted to the server computer, or, in the opposite direction, which essentially removes the requests for acknowledgement of the receipt of the data packets to be transmitted to the client computer from the data packets, which are produced by the data processing program of the server computer during display of the interactive user program, before they are transmitted to the client computer.

BRIEF DESCRIPTION OF THE DRAWING

The invention will now be described by way of a preferred embodiment with reference to the accompanying drawing, in which.

DETAILED DESCRIPTION

Figure 1:
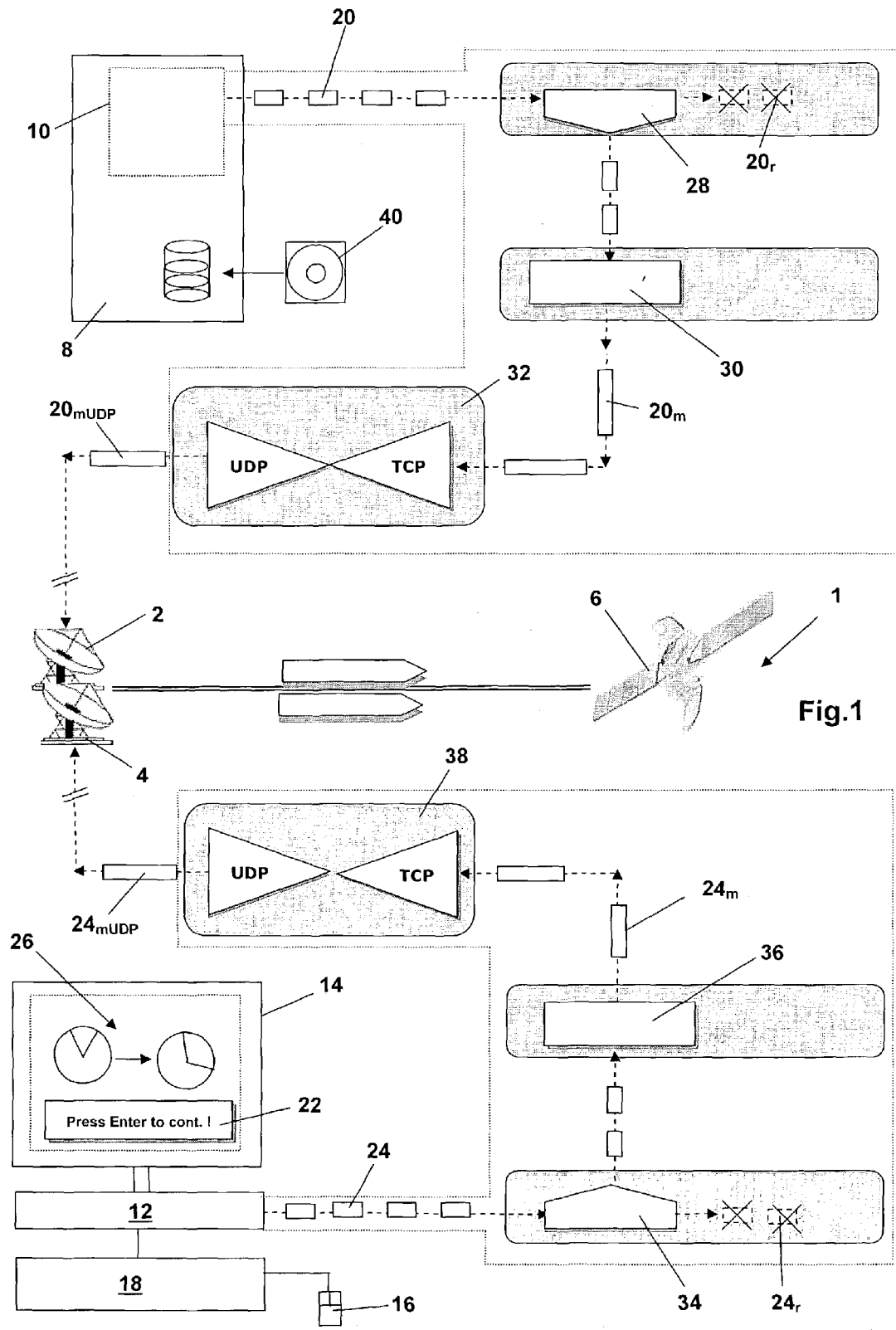
FIG. 1 is a schematic representation of a satellite network according to the invention with the individual process steps for reduction of the latency time for an interactive client-server application according to the invention.

As FIG. 1 shows, a satellite network 1 according to the invention comprises a server-based ground station (satellite HUB) 2 as well as a client-based ground station 4, which are connected for data communication via a geostationary satellite 6.

The server-based ground station 2 is connected to a server computer 8 via lines which are not described in more detail, the computer being operated by a client-server operating system such as UNIX or "Windows 2000 Server" and running a data processing program 10 e.g. a spreadsheet.

The client-based ground station 4 is connected to a client computer 12 via data lines, which are also not described in more detail, the computer being linked to a display medium in the form of a monitor 14 as well as an input medium in the form of a mouse 16 and/or keyboard 18 for data input. The client computer 12 is operated by the client-based part of the client-server operating system, for example the familiar operating system of the Microsoft Corporation called "Terminal Service" which receives data produced by the data processing program 10 of the server computer 8 and transmitted in the form of data packets 20 displayed on the monitor 14 as an interactive user program 26 shown in FIG. 1 by the schematically drawn pie charts.

When using the user program 26 the operator of the interactive user program is requested by an input prompt 22 displayed on the monitor 14, for example in the form of a flashing cursor or text message such as "PRESS ENTER TO CONTINUE", to enter further data using the mouse 16 or the keyboard 18 which are sent in the form of further data packets 24 via the geostationary satellite 6 to the server 8 which requires them in order to continue running the data processing program 10.

As can be further seen from the representation in FIG. 1, the data packets 20 are produced by the data processing program 10 as individual data packets which satisfy the requirements of the TCP-IP network transfer protocol. This means that the data packets 20 contain in particular data which represent acknowledgements of the receipt of data packets received earlier by the client computer 12 or requests to the client computer 12 to transmit acknowledgements for the secure receipt of the particular data packets 20. It is preferable that these TCP data packets 20 once produced are passed through a redundancy filter 28 which scans the data packets 20 produced by the server computer 8 for redundant data $20_r$ before sending them to the client computer 12 via the geostationary satellite 6 and removes the detected redundant data $20_r$ from the data packets 20 or—if sensible for the application in question—replaces them by data stored in the server computer 8 which are required by the client computer to, for example, maintain the network connection between the client computer and server computer.

The redundancy filter 28 may be realized either via hardware in the form of a hardware unit of the server computer 8 or via software in the form of a data processing program running on the server computer 8.

Following this, the data packets 20 cleared of redundant data 24, are supplied to a server-based unit 30 for optimizing the packet size by combining the data packets 20 into larger data packets $20_m$ whose length corresponds to the maximum packet length transferable over the network 1 (MTU) without fragmentation.

The optimized data packets $20_m$ are then supplied to a protocol converter 32. The protocol converter 32, which is preferably also realized via software on the server computer 8, converts the TCP conforming data packets $20_m$ in such a way that after conversion they satisfy the requirements of the UDP network transfer protocol and the acknowledgements or requests for transfer of acknowledgements contained in them are eliminated or at least neutralized. The converted data packets $20_{mUDP}$ are then forwarded to the server-based ground station 2 and transferred from there via the geostationary satellite 6 to the client-based ground station 4 from where they are supplied preferably without further conversion to the client computer 12 which directly further processes these data packets $20_{mUDP}$ and displays the data contained in them on the monitor 14.

If the user of the client computer 12 in his work with the interactive user program makes an input using the mouse 16 or keyboard 18, for example in response to a screen display produced by the client computer 12 or its operating system from data packets $20_{mUDP}$ transmitted earlier by the server computer, the entered instructions and further data are produced by the operating system of the client computer 12 in the form of further data packets 24 which meet the requirements of the TCP-IP network transfer protocol.

The further TCP data packets 24, when produced in this way, are passed through a further redundancy filter 34 as shown in FIG. 1, which scans the further data packets 24 for redundant data 24, before sending them to the server computer 8 via the geostationary satellite 6 and removes the detected redundant data 24, from the further data packets 24 or—if sensible for the application in question—replaces them by data stored in the client computer 12 which are required by the server computer 8 especially to maintain the network connection between the client computer 12 and server computer 8.

The further redundancy filter 34 may be realized either via hardware by a hardware unit of the client computer 12 or via software by a data processing program running on the client computer 12, which, when using "Windows 2000 Server" as the operating system, intervenes in the area of the operating system of the client computer described as "Winsocket".

Following this, the further data packets 24 cleared of redundant data 24, are supplied to a client-based unit 36 for optimizing the packet size by combining the further data packets 24 into larger further data packets $24_m$ whose length corresponds to the maximum packet length transferable over the network 1 (MTU) without fragmentation.

The further data packets $24_m$ optimized in this way are then supplied to a further protocol converter 38, which is preferably also realized via software on the client computer 12, which converts the further data packets of optimum length $24_m$, which meet the TCP standard, in such a way that after conversion they satisfy the requirements of the UDP network transfer protocol and the acknowledgements or requests for transfer of acknowledgements contained in them are eliminated or at least neutralized. The converted further data packets $24_{mUDP}$ of optimum length are then forwarded to the client-based ground station 4 and transferred from there via the geostationary satellite 6 to the server-based ground station 2 from where they are supplied preferably without further conversion to the server computer 8. The server computer 8 receives these optimized and converted further data packets $24_{mUDP}$ preferably directly without previous backconversion into TCP-conforming packets and passes the further data contained in them on to the data processing program 10.

The previously described manipulation of the data packets 20 and further data packets 24 by the redundancy filters 28, 34, the units 30 and 36 for optimizing the packet length, as well as the TCP-UDP converters 32 and 38 are realized in the preferred embodiment of the invention by an appropriate software program which may be transported, for example, on a mobile data carrier 40 in the form of a CD-ROM and loaded onto the particular hard disks of the server computer 8 and/or client computer 12 for use. The realization via software on the server computer 8 or client computer 12 is shown in FIG. 1 by the dotted lines.

LIST OF REFERENCE NUMBERS

1 Satellite network
2 Server-based ground station
4 Client-based ground station
6 Geostationary satellite
8 Server computer
10 Data processing program on the server computer
12 Client computer
14 Monitor 16 Mouse
18 Keyboard
20 Data packets produced by the server computer
$20_r$ Redundant data in data packets
$20_m$ Optimum length data packets
$20_{mUDP}$ Data packets after conversion, satisfying the UDP standard
22 Input prompt
24 Further data packets
$24_r$ Redundant data in the further data packets
$24_m$ Optimum length further data packets
$24_{mUDP}$ Further data packets after conversion, satisfying the UDP standard
26 Interactive user program on the client computer
28 Redundancy filter for data packets
30 Server-based unit for optimizing packet length
32 Protocol converter
34 Further redundancy filter
36 Client based unit for optimizing packet length
38 Further protocol converter
40 Data carrier containing a software program

What is claimed is:

1. A method for reducing latency time for interactive data communication between a client computer and a server computer running a data processing program, wherein the client computer and the server computer are connected via a satellite network containing a geostationary satellite, and the server computer undertakes actual data processing and the client computer assumes a function of an intelligent terminal producing an interactive screen display for a user of the client computer, wherein data is transferred between the server computer and the client computer via data packets and further data packet, the method comprising the steps of:

transferring a data packet or a further data packet between the client computer and the server computer via the satellite in accordance with a transmission control protocol (TCP) network transfer protocol to establish a network connection between the client computer and the server computer via the satellite;

determining that a network connection has been established, and subsequent to determining that a network connection has been established:

transferring, from the server computer to the client computer, data packets comprising data produced via the data processing program running on the server computer, the data produced being displayed by said client computer via a display medium connected to the client computer as an interactive user program, the data packets being generated through conversion from data packets for transfer according to the TCP network transfer protocol to data packets for transfer according to a datagram protocol (UDP) network transfer protocol, wherein the data packets converted are transferred via the satellite in accordance with the UDP network transfer protocol;

providing an operator of the client computer an input prompt by the interactive user program requesting that the user enter further data;

transferring the further data from the client to the server computer as further data packets transmitted via the satellite network, the further data packets being generated through conversion from further data packets for transfer according to the TCP network transfer protocol to further data packets for transfer according to the UDP network transfer protocol, wherein the further data packets converted are transferred via the satellite in accordance with the UDP network transfer protocol;

providing an acknowledgement of receipt of at least one of the further data packets by the server computer and not providing an acknowledgement of receipt of at least another one of the further data packets by the server computer such that the transfer of the further data packets from the client computer to the server computer occurs essentially without acknowledgement of receipt of the further data packets by the server computer; and transferring a data packet or a further data packet between the client computer and the server computer via the satellite in accordance with the TCP network transfer protocol to complete transfer of data packets and further data packets between the client computer and the server computer via the satellite.

2. The method according to claim 1 wherein the transferring of the data packets from the server computer to the client computer occurs essentially without acknowledgement of receipt of the transferred data packets by the client computer.

3. The method according to claim 1 further comprising:
scanning the further data packets for redundant data before the transferring of the further data packets to the server computer; and
removing the detected redundant data from the further data packets.

4. The method as recited in claim 3 wherein the removing step includes replacing the detected redundant data with already-entered data.

5. The method according to claim 3 wherein the removing of the redundant data from the further data packets occurs via hardware using a hardware unit of the client computer.

6. The method according to claim 3 wherein the removing of the redundant data from the further data packets occurs via software in the form of a data processing program running on the client computer.

7. The method according to claim 6 wherein the redundant data in the further data packets from the client computer comprise periodically repeating portions of data.

8. The method as recited in claim 7 wherein the periodically repeating portions of data are transmitted data that ensure a network connection is maintained between the client computer and the server computer.

9. The method according to claim 7 wherein the periodically repeating portions of data are produced independently by the server computer without the periodically repeating portions being transmitted by the client computer.

10. The method according to claim 1 further comprising:
scanning the data packets produced by the server computer for redundant data before the transferring to the client computer; and
removing the detected redundant data from the data packets.

11. The method according to claim 10 wherein the removing the detected redundant data includes replacing the detected redundant data with data stored in the server computer.

12. The method according to claim 10 wherein the removing of the redundant data from the data packets occurs via hardware using a hardware unit of the server computer.

13. The method according to claim 10 wherein the removing of the redundant data from the data packets occurs via software in the form of a data processing program running on the server computer.

14. The method according to claim 13 wherein the redundant data in the data packets sent by the server computer include periodically repeating portions of data.

15. The method as recited in claim 14 wherein the periodically repeating portions of data include flashing input prompts used by the interactive user program for interactive display on the display medium and/or portions of data in the data packets required by the client computer to maintain a network connection between the client computer and the server computer.

16. The method according to claim 14 wherein the periodically repeating portions of data removed from the data packets sent by the server computer are produced independently by the client computer without transmission by the server computer.

17. The method according to claim 1 further comprising detecting via the client computer frequently recurring data sequences in the data packets, storing a copy of these frequently recurring data sequences or an image representation corresponding to these data sequences in a memory of the client computer and displaying on the display medium a copy of the data sequences or the image representation stored in the memory instead of the recurring data sequences.

18. The method according to claim 1 further comprising combining several of the data packets and/or further data packets to be transferred between the server computer and the client computer via the geostationary satellite into larger data packets and/or larger further data packets.

19. The method according to claim 18 wherein the combined larger data packets and/or the combined larger further data packets have an optimum size such that transfer via the geostationary satellite occurs without fragmentation of the data packets.

20. The method according to claim 19 further comprising determining the optimum size of the larger data packets and/or larger further data packets by the server computer when setting up the satellite network for a particular connection to the client computer based on parameters specific to the connection.

21. The method according to claim 19 further comprising determining the optimum size of the larger data packets and/or the larger further data packets by the server computer during data exchange between the client computer and server computer for the particular connection to the client computer based on parameters specific to the connection.

22. A satellite network for executing the method according to claim 1 comprising:
a geostationary satellite;
a client computer; and
a server computer connected to the client computer via the geostationary satellite, the server computer executing a data processing program producing data, and the server computer and the client computer having program executable steps permitting the data produced to be transferred to the client computer in as data packets and displayed by said client computer via a display medium connected to the client computer as an interactive user program, and whereby an operator of the client computer is provided an input prompt by the user program to enter further data, the further data being transferred to the server computer as further data packets via the geostationary satellite,
wherein a data packet or a further data packet is transferred between the client computer and the server computer via the satellite in accordance with a transmission control protocol (TCP) network transfer protocol to establish a network connection between the client computer and the server computer via the satellite,
wherein the data packets comprising the data produced are generated through conversion from data packets for transfer according to the TCP network transfer protocol to data packets for transfer according to a datagram protocol (UDP) network transfer protocol, wherein the data packets converted are transferred via the satellite in accordance with the UDP network transfer protocol;
wherein the further data packets are generated through conversion from further data packets for transfer according to the TCP network transfer protocol to further data packets for transfer according to the UDP network transfer protocol, and wherein the further data packets converted are transferred via the satellite in accordance with the UDP network transfer protocol,
wherein transferring the further data comprises providing an acknowledgement of receipt of at least one of the further data packets by the server computer and not providing an acknowledgement of receipt of at least another one of the further data packets by the server computer such that the transfer of the further data packets from the client computer to the server computer occurs essentially without acknowledgement of receipt of the further data packets by the server computer, and
wherein a data packet or a further data packet is transferred between the client computer and the server computer via the satellite in accordance with the TCP network transfer protocol to complete transfer of data packets and further data packets between the client computer and the server computer via the satellite.

23. The satellite network as recited in claim 22 wherein the transfer of the data packets from the server computer to the client computer occurs essentially without an acknowledgement of the receipt of the transferred data packets by the client computer.

24. A non-transitory computer readable storage medium storing thereon a software program for reducing the latency time for interactive data communication between a client computer and a server computer, wherein the client computer and the server computer are connected via a satellite network containing a geostationary satellite, and the server computer undertakes actual data processing and the client computer assumes a function of an intelligent terminal producing an interactive screen display for a user of the client computer, whereby a data processing program runs on the server computer producing data, the data produced being transferred to the client computer as data packets and display of the data by said client computer via a display medium connected to the client computer as an interactive user program, and whereby an operator of the client computer is provided an input prompt by a user program to enter further data, the further data being transferred to the server computer in the form of further data packets via the satellite network, the software program comprising machine executable code that, when executed by a computer, causes:
transferring a data packet or a further data packet between the client computer and the server computer via the satellite in accordance with a transmission control protocol (TCP) network transfer protocol to establish a network connection between the client computer and the server computer via the satellite;
transferring, from the server computer to the client computer, data packets comprising data produced via the data processing program running on the server computer, the data produced being displayed by said client computer via a display medium connected to the client computer as an interactive user program, the data packets being generated through conversion from data packets for transfer according to data packets for transfer according to the TCP network transfer protocol to a datagram protocol (UDP) network transfer protocol, wherein the data packets converted are transferred via the satellite in accordance with the UDP network transfer protocol;

providing an operator of the client computer an input prompt by the interactive user program requesting that the user enter further data; and transferring the further data to the server computer as further data packets transmitted via the satellite network, the further data packets being generated through conversion from further data packets for transfer according to further data packets for transfer according to the TCP network transfer protocol to the UDP network transfer protocol, wherein the further data packets converted are transferred via the satellite in accordance with the UDP network transfer protocol, wherein transferring the further data comprises removing a request for acknowledgement of receipt of at least one of the further data packets by the server computer and to not remove a request for acknowledgement of receipt of at least another one of the further data packets by the server computer such that the transfer of the further data packets from the client computer to the server computer occurs essentially without acknowledgement of receipt of the further data packets by the server computer; and transferring a data packet or a further data packet between the client computer and the server computer via the satellite in accordance with the TCP network transfer protocol to complete transfer of data packets and further data packets between the client computer and the server computer via the satellite.

25. A non-transitory computer readable storage medium storing thereon a software program for reducing the latency time for interactive data communication between a client computer and a server computer, wherein the client computer and the server computer are connected via a satellite network containing a geostationary satellite, and the server computer undertakes actual data processing and the client computer assumes the function of an intelligent terminal producing an interactive screen display for the user of the client computer, whereby a data processing program runs on the server computer producing data, the data produced being transferred to the client computer as data packets and displayed by said client computer via a display medium connected to the client computer as an interactive user program, and whereby an operator of the client computer is given an input prompt by the interactive user program to enter further data, the further data being transferred to the server computer as further data packets via the satellite network, the software program comprising machine executable code that, when executed by a computer, causes:

transferring a data packet or a further data packet between the client computer and the server computer via the satellite in accordance with a transmission control protocol (TCP) network transfer protocol to establish a network connection between the client computer and the server computer via the satellite;

transferring, from the server computer to the client computer, data packets comprising data produced via the data processing program running on the server computer, the data produced being displayed by said client computer via a display medium connected to the client computer as an interactive user program, the data packets being generated through conversion from data packets for transfer according to the TCP network transfer protocol to data packets for transfer according to a datagram protocol (UDP) network transfer protocol, wherein the data packets converted are transferred via the satellite in accordance with the UDP network transfer protocol;

providing an operator of the client computer an input prompt by the interactive user program requesting that the user enter further data; and transferring the further data to the server computer as further data packets transmitted via the satellite network, the further data packets being generated through conversion from further data packets for transfer according to the TCP network transfer protocol to further data packets for transfer according to the UDP network transfer protocol, wherein the further data packets converted are transferred via the satellite in accordance with the UDP network transfer protocol;

providing an acknowledgement of receipt of at least one of the further data packets by the server computer and not providing an acknowledgement of receipt of at least another one of the further data packets by the server computer such that the transfer of the further data packets from the client computer to the server computer occurs essentially without acknowledgement of receipt of the further data packets by the server compute; and transferring a data packet or a further data packet between the client computer and the server computer via the satellite in accordance with the TCP network transfer protocol to complete transfer of data packets and further data packets between the client computer and the server computer via the satellite.

26. A method for reducing latency time for interactive data communication between a client computer and a server computer running a data processing program, wherein the client computer and the server computer are connected via a satellite network, and the server computer undertakes actual data processing and the client computer assumes a function of an intelligent terminal producing an interactive screen display for a user of the client computer, wherein data is transferred between the server computer and the client computer via data packets and further data packet, the method comprising the steps of:

producing data via the data processing program running on the server computer;

transferring a data packet or a further data packet between the client computer and the server computer via the satellite in accordance with a transmission control protocol (TCP) network transfer protocol to establish a network connection between the client computer and the server computer via the satellite;

transferring, from the server computer to the client computer, data packets comprising data produced via the data processing program running on the server computer, the data produced being displayed by said client computer via a display medium connected to the client computer as an interactive user program, the data packets being generated through conversion from data packets for transfer according to data packets for transfer according to the TCP network transfer protocol to a datagram protocol (UDP) network transfer protocol, wherein the data packets converted are transferred via the satellite in accordance with the UDP network transfer protocol;

providing an operator of the client computer an input prompt by the interactive user program to enter further data; and transferring the further data from the client computer to the server computer as further data packets via the network, the further data packets being generated through conversion from further data packets for transfer according to the TCP network transfer protocol to further data packets for transfer according to the UDP network transfer protocol, wherein the further data packets converted are transferred via the satellite in accordance with the UDP network transfer protocol, wherein transferring the further data comprising removing a request for acknowledgement of receipt of at least one of the further data packets by the server computer and to not remove a request for acknowledgement of receipt of at least another one of the further data packets by the server computer such that the transfer of the further data packets from the client computer to the server computer occurs essentially without acknowledgement of receipt of the further data packets by the server computer;

transferring a data packet or a further data packet between the client computer and the server computer via the satellite in accordance with the TCP network transfer protocol to complete transfer of data packets and further data packets between the client computer and the server computer via the satellite.

27. A non-transitory computer readable storage medium storing thereon a software program for reducing the latency time for interactive data communication between a client computer and a server computer, wherein the client computer and the server computer are connected via a satellite network, and the server computer undertakes actual data processing and the client computer assumes a function of an intelligent terminal producing an interactive screen display for a user of the client computer, whereby a data processing program runs on the server computer producing data, the data produced being transferred to the client computer as data packets and display of the data by said client computer via a display medium connected to the client computer as an interactive user program, and whereby an operator of the client computer is provided an input prompt by a user program to enter further data, the further data being transferred to the server computer as further data packets via the satellite network, the software program comprising machine executable code that, when executed by a computer, causes:

transferring a data packet or a further data packet between the client computer and the server computer via the satellite in accordance with a transmission control protocol (TCP) network transfer protocol to establish a network connection between the client computer and the server computer via the satellite;

transferring, from the server computer to the client computer, data packets comprising data produced via the data processing program running on the server computer, the data produced being displayed by said client computer via a display medium connected to the client computer as an interactive user program, the data packets being generated through conversion from data packets for transfer according to the TCP network transfer protocol to data packets for transfer according to a datagram protocol (UDP) network transfer protocol, wherein the data packets converted are transferred via the satellite in accordance with the UDP network transfer protocol;

providing an operator of the client computer an input prompt by the interactive user program requesting that the user enter further data; and transferring the further data to the server computer as further data packets transmitted via the satellite network, the further data packets being generated through conversion from further data packets for transfer according to the TCP network transfer protocol to further data packets for transfer according to the UDP network transfer protocol, wherein the further data packets converted are transferred via the satellite in accordance with the UDP network transfer protocol; and transferring a data packet or a further data packet between the client computer and the server computer via the satellite in accordance with the TCP network transfer protocol to complete transfer of data packets and further data packets between the client computer and the server computer via the satellite.

28. A non-transitory computer readable storage medium storing thereon a software program for reducing the latency time for interactive data communication between a client computer and a server computer, wherein the client computer and the server computer are connected via a satellite network, and the server computer undertakes actual data processing and the client computer assumes a function of an intelligent terminal producing an interactive screen display for a user of the client computer, whereby a data processing program runs on the server computer producing data, the data produced being transferred to the client computer as data packets and displayed by said client computer via a display medium connected to the client computer as an interactive user program, and wherein further data is received at the client computer, the further data being transferred to the server computer as further data packets via the satellite network, the software program comprising machine executable code that, when executed by a computer, causes:

transferring data between the client computer and the server computer via the satellite in accordance with a transmission control protocol (TCP) network transfer protocol to establish a network connection between the client computer and the server computer via the satellite;

transferring, from the server computer to the client computer, data packets comprising data produced via the data processing program running on the server computer, the data produced being displayed by said client computer via a display medium connected to the client computer as an interactive user program, the data packets being generated through conversion from data packets for transfer according to the TCP network transfer protocol to a datagram protocol (UDP) network transfer protocol and being transferred via the satellite in accordance with the UDP network transfer protocol;

receiving further data at the client computer; and transferring the further data to the server computer as further data packets transmitted via the satellite network, the data packets being generated through conversion from further data packets for transfer according to the TCP network transfer protocol to the UDP network transfer protocol and being transferred via the satellite in accordance with the UDP network transfer protocol; and transferring data between the client computer and the server computer via the satellite in accordance with the TCP network transfer protocol to complete transfer of data packets and further data packets between the client computer and the server computer via the satellite.

* * * * *

UNITED STATES PATENT AND TRADEMARK OFFICE
CERTIFICATE OF CORRECTION

PATENT NO. : 8,082,357 B2  
APPLICATION NO. : 10/331387  
DATED : December 20, 2011  
INVENTOR(S) : Rock et al.

Page 1 of 1

It is certified that error appears in the above-identified patent and that said Letters Patent is hereby corrected as shown below:

On the Title Page:

Please insert:

Item --(30) Foreign Application Priority Data:

January 4, 2002 DE............ 102 00 165.0--

Signed and Sealed this  
Twenty-eighth Day of August, 2012

David J. Kappos  
*Director of the United States Patent and Trademark Office*